US009044862B2

(12) United States Patent
Kim et al.

(10) Patent No.: US 9,044,862 B2
(45) Date of Patent: Jun. 2, 2015

(54) PATH PLANNING APPARATUS AND METHOD FOR ROBOT

(75) Inventors: Myung Hee Kim, Suwon-si (KR); Kyung Shik Roh, Seongnam-si (KR); San Lim, Suwon-si (KR); Bok Man Lim, Seoul (KR); Guo Chunxu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 878 days.

(21) Appl. No.: 12/805,514

(22) Filed: Aug. 3, 2010

(65) Prior Publication Data
US 2011/0035051 A1    Feb. 10, 2011

(30) Foreign Application Priority Data
Aug. 10, 2009  (KR) .................. 10-2009-0073153

(51) Int. Cl.
| G01C 21/34 | (2006.01) |
| B25J 9/16 | (2006.01) |
| G01C 22/00 | (2006.01) |
| G05B 19/04 | (2006.01) |
| G05B 19/18 | (2006.01) |

(52) U.S. Cl.
CPC ..... B25J 9/1666 (2013.01); *G05B 2219/40264* (2013.01)

(58) Field of Classification Search
CPC .............. G05D 1/0212; G05D 1/0221; G05D 2201/0207; G05D 2201/0209; G05D 2201/0215; B25J 9/1666; G05B 19/4061; G05B 19/41; G05B 2219/33027; G05B 2219/40421; G05B 2219/40443; G05B 2219/40444
See application file for complete search history.

(56) References Cited

U.S. PATENT DOCUMENTS

| 4,990,838 | A | * | 2/1991 | Kawato et al. | 700/246 |
| 5,502,638 | A | * | 3/1996 | Takenaka | 701/87 |
| 5,580,209 | A | * | 12/1996 | Ogawa et al. | 414/729 |
| 5,999,881 | A | * | 12/1999 | Law et al. | 701/301 |
| 6,493,607 | B1 | * | 12/2002 | Bourne et al. | 700/255 |
| 7,272,492 | B2 | * | 9/2007 | McCubbin et al. | 701/533 |

(Continued)

OTHER PUBLICATIONS

Stentz, A., Optimal and Efficient Path Planning for Partially-Known Environments, Robotics and Automation, 1994. UProceedings., 1994 IEEE International Conference on May 8-13, 1994 pp. 3310-3317 vol. 4.*

(Continued)

*Primary Examiner* — Ryan Zeender
*Assistant Examiner* — Dana Amsdell
(74) *Attorney, Agent, or Firm* — Harness, Dickey & Pierce, P.L.C.

(57) ABSTRACT

Disclosed herein are a path planning apparatus and a method for a robot to plan an optimal path along which a manipulator of a robot moves to a goal point from a start point. An obstacle within a prescribed angle on a straight line connecting a start point and a goal point is recognized as a middle point in a configuration space and arbitrary points separated from the middle point by a prescribed distance are selected. Among the selected points, arbitrary points which can directly connect the start point and the goal point without passing the obstacle are selected as waypoints to map a new middle node. A path is extended via the middle node and extension of a tree in a wrong direction is minimized so that the manipulator is not struck at local minima without depending greatly on a goal score, thereby improving the performance of path planning and rapidly searching for a path.

16 Claims, 19 Drawing Sheets

(56) References Cited

U.S. PATENT DOCUMENTS

| | | |
|---|---|---|
| 7,957,858 B1* | 6/2011 | Larson et al. .................. 701/23 |
| 8,239,084 B2* | 8/2012 | Yamamoto et al. ............. 701/26 |
| 8,825,209 B2* | 9/2014 | Kim et al. ..................... 700/246 |
| 2003/0070153 A1* | 4/2003 | Stevens et al. ................. 716/12 |
| 2006/0063491 A1* | 3/2006 | Sudo ........................... 455/63.1 |
| 2006/0235610 A1* | 10/2006 | Ariyur et al. ................. 701/202 |
| 2008/0007193 A1* | 1/2008 | Jones et al. ............. 318/568.12 |
| 2008/0091340 A1* | 4/2008 | Milstein et al. ............... 701/201 |
| 2008/0183349 A1* | 7/2008 | Abramson et al. ............. 701/23 |
| 2011/0035087 A1* | 2/2011 | Kim et al. ....................... 701/25 |

OTHER PUBLICATIONS

Bohlin, R. and Kavraki, L., Path Planning Using Lazy PRM, Robotics and Automation, 2000 IEEE, Proceedings of the International Conference on Robotics and Automation in San Francisco, CA, Apr. 2000, pp. 521-528, vol. 1.*

* cited by examiner (a)

(b)

PATH PLANNING APPARATUS AND METHOD FOR ROBOT

CROSS-REFERENCE TO RELATED APPLICATIONS

This application claims the benefit of Korean Patent Application No. 2009-0073153, filed on Aug. 10, 2009 in the Korean Intellectual Property Office, the disclosure of which is incorporated herein by reference.

BACKGROUND

1. Field

Embodiments relate to a path planning apparatus and method of a robot to plan an optimal path along which a manipulator of the robot moves to a goal point from a start point.

2. Description of the Related Art

Generally, a robot refers to an apparatus performing motion similar to human operation using electric or magnetic work. Earlier robots were industrial robots, such as manipulators or transfer robots used for work automation, or unmanned systems and have carried out dangerous work, simple repeated work, or work requiring a great amount of force. Recently, research has been actively conducted into a humanoid robot that has a joint system similar to that of humans, lives with humans in a human workplace or residence, and provides various services.

Such a humanoid robot works using a manipulator designed to move similarly to an operation of human arms or hands by an electronic and mechanical mechanism. Most currently used manipulators are configured such that multiple links are connected to each other. A connection part of the links is called a joint. A movement characteristic of the manipulator depends on a geometric relationship between links and joints. Kinematics is the mathematic expression of such a geometric relationship. Most of the manipulators shift a robot end-effector to a goal point to implement work with a kinematic characteristic.

In order for the manipulator to perform given work (e.g., work to grasp an object), it is important to generate a moving path of the manipulator from an initial position (start point) before the manipulator performs work to a final position (goal point) at which the manipulator can perform work, that is, when the manipulator can grasp the object. The moving path of the manipulator, which can move without collision with obstacles within a work area from the start point to the goal point, may be automatically generated by an algorithm. The algorithm may include a process to search for a free space where the manipulator does not collide with obstacles and a process to plan a moving path of the manipulator in the free space. An exemplary embodiment describes a method using a rapidly-exploring random tree (RRT) algorithm in a circumstance having a high degree of freedom or complicated restriction conditions in a sampling based path planning algorithm among path planning methods to plan an optimal path connecting a start point to a goal point while satisfying a restriction condition, such as obstacle avoidance.

The RRT algorithm refers to a method to search for a moving path to a final goal point while extending a tree by repeating a process to select the nearest node from an initial start point using a randomly-sampled configuration in a configuration space (C-space) in which the manipulator performs work. Two methods may be utilized to search for the nearest node: a method using a difference between a goal node and a current node when information about a goal configuration of a final goal point is known, and a method to generate a goal function by a function of a distance and direction vector from a current end effector and a goal end effect and to extend a tree by selecting a node having the least goal function, when information about a goal configuration of a final goal point is known or unknown.

An RRT algorithm using the goal function has been proposed in the case in which a goal configuration is unknown among the conventional RRT algorithms. However, when the RRT algorithm depends greatly on the goal function, if the goal function is not accurately determined, the manipulator may be stuck at local minima and may not obtain a solution. The manipulator may be saved from the local minima by changing the goal function. However, since a tree may be extended in a wrong direction before the manipulator recognizes the local minima, a speed to search for the solution becomes slow and thus considerable time is consumed to search for a path.

SUMMARY

Therefore, it is an aspect of the at least one embodiment to provide a path planning apparatus and method for a robot which can improve the performance of path planning by minimizing the extension of a tree in a wrong direction without depending greatly on a goal score.

Additional aspects will be set forth in part in the description which follows and, in part, will be obvious from the description, or may be learned by practice of the invention.

The foregoing and/or other aspects are achieved by providing a path planning method of a robot including forming a configuration space to generate a moving path of a manipulator, if an obstacle is present between a start point and a goal point of the configuration space, selecting a new waypoint by recognizing the obstacle as a middle point, generating a search graph by extending a tree so that a node generated at the start point reaches the goal point via the waypoint, generating an optimal path to avoid the obstacle by connecting the start point and the goal point through the search graph.

The start point may be a node which forms, in the configuration space, a configuration at an initial position before the manipulator performs work.

The goal point may be a node which forms, in the configuration space, a configuration at a goal position in which the manipulator performs work or a point having a position of the goal point and orientation information.

The middle point may be an obstacle within a prescribed angle on a straight line connecting the start point and the goal point.

The selection of the waypoint may include selecting arbitrary points separated from the middle point by a prescribed distance to connect the arbitrary points to the start point and to the goal point and selecting an arbitrary point having no obstacle between the selected arbitrary points and the start and goal points as the waypoint.

The selection of the waypoint may include selecting a nearest waypoint to a randomly sampled configuration starting from the start point as a goal waypoint.

The extension of the tree may include searching for a nearest node to a randomly sampled configuration based on a goal function varied according to probability and connecting the sampled configuration to the nearest node.

The foregoing and/or other aspects are achieved by providing a path planning method for a robot including recognizing a start point and a goal point corresponding respectively to an initial configuration and a goal configuration, in a configuration space, of a manipulator of the robot, if an obstacle is present between the start point and the goal point, mapping at least one waypoint by recognizing the obstacle as a middle point, searching for a node nearest to any one randomly sampled point in a configuration space to connect the sampled point to the node, generating a search graph by extending a tree so that the node reaches the goal point via the at least one waypoint, and generating an optimal path to avoid the obstacle by connecting the start point to the goal point through the search graph.

The mapping of the new waypoint may include selecting the at least one waypoint in consideration of a goal function.

The selection of the waypoint may include extending the tree by selecting a nearest waypoint to a randomly sampled configuration, starting from the start point, as a goal waypoint.

The foregoing and/or other aspects are achieved by providing a path planning apparatus of a robot including a processing device, a recognizer to recognize a start point and a goal point corresponding respectively to an initial configuration and a goal configuration in a configuration space, of a manipulator of the robot, and an obstacle between the start point and the goal point, and a path planning generator to form the configuration space utilized to generate a moving path of the manipulator, select at least one waypoint by recognizing the obstacle as a middle point based on the configuration space, and generate an optimal path by connecting the start point and the goal point using the at least one waypoint.

The path planning generator may select arbitrary points separated from the middle point by a prescribed distance to connect the arbitrary points to the start point and to the goal point and select one of the selected arbitrary points having no obstacle between the selected arbitrary points and the start and goal points as the at least one waypoint.

The path planning generator may search for a node nearest to any one randomly sampled point in the configuration space to connect the sampled point and the node and generate a search graph by extending a tree so that the node reaches the goal point via the waypoint.

The path planning generator may extend the tree by connecting a newly sampled point and a nearest node to the newly sampled point and select a nearest waypoint to the newly sampled point as a goal waypoint.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
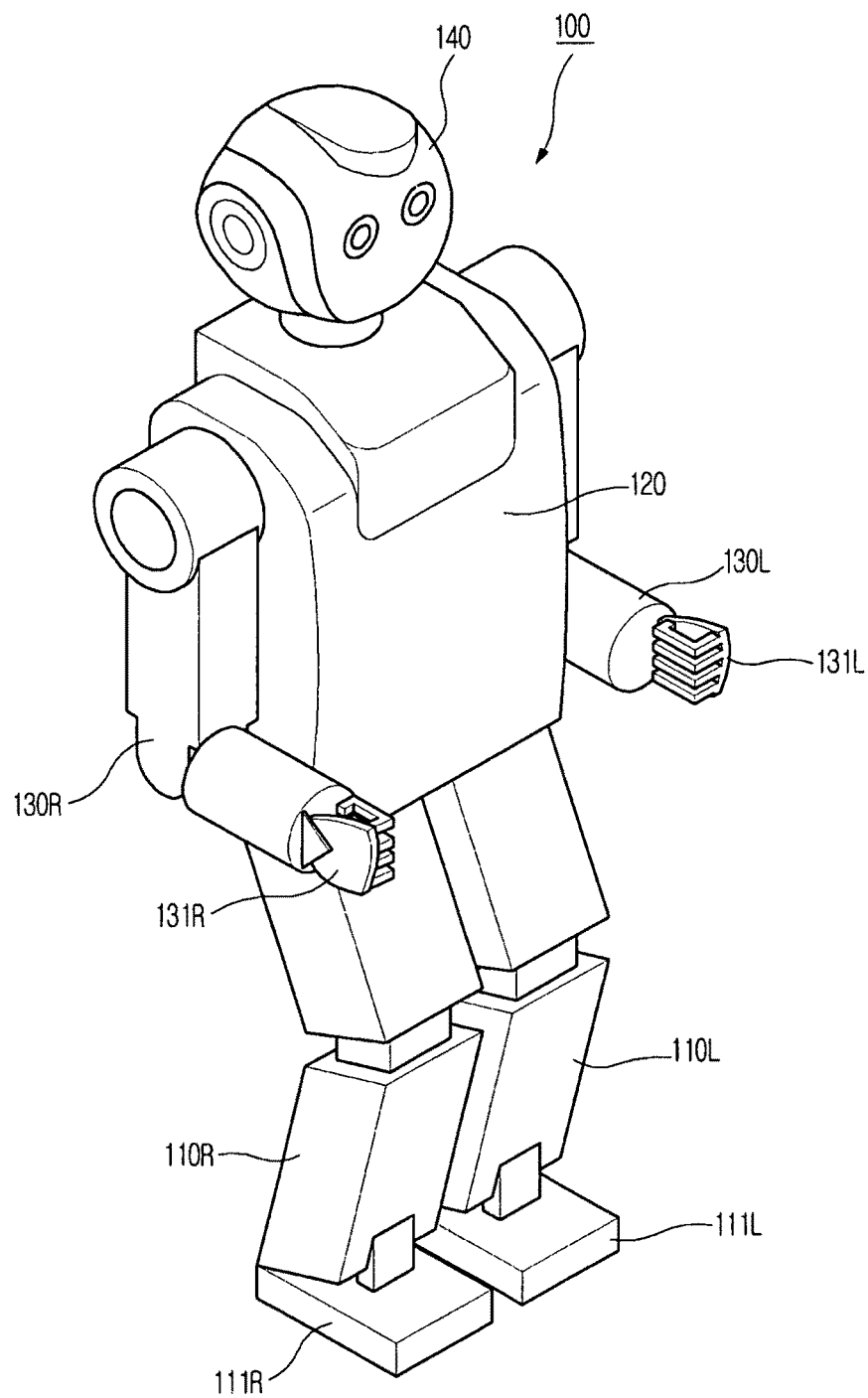
FIG. 1 illustrates an example of an outer appearance of a robot according to an exemplary embodiment.

Reference will now be made in detail to the at least one embodiment, examples of which are illustrated in the accompanying drawings, wherein like reference numerals refer to like elements throughout.

FIG. 1 illustrates an example of an outer appearance of a robot according to an exemplary embodiment.

Referring to FIG. 1, a robot 100 according to an exemplary embodiment is a bipedal walking robot moving using two legs 110R and 100L. The robot 100 includes a body 120, two arms 130R and 130L, and a head 140 located at the upper side of the body 120. Feet 111R and 111L and hands 131R and 131L are connected to ends of the legs 110R and 110L and the arms 130R and 130L, respectively.

In reference numerals indicated in FIG. 1, 'R' and 'L' denote right and left sides of the robot 100, respectively.

Figure 2:
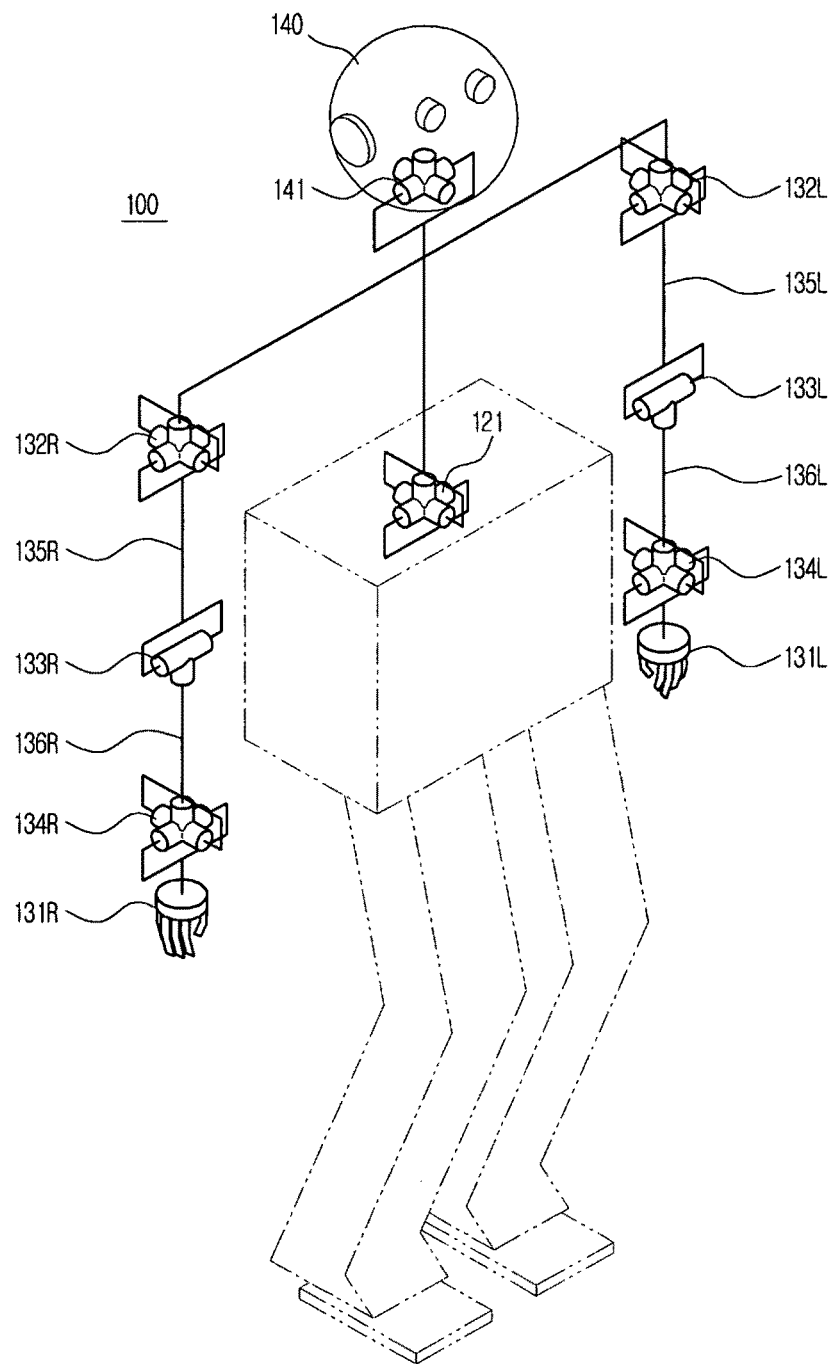
FIG. 2 illustrates a main joint structure of the robot shown in FIG. 1.

FIG. 2 illustrates a main joint structure of the robot shown in FIG. 1.

In FIG. 2, two arms 130R and 130L include shoulder joints 132R and 132L, elbow joints 133R and 133L and wrist joints 134R and 134L. The shoulder joints 132R and 132L are located at both ends of the upper side of the body 120.

The shoulder joints 132R and 132L of the arms 130R and 130L can move in the directions of an x-axis (roll axis), a y-axis (pitch axis), and a z-axis (yaw axis). The elbow joints 133R and 133L can move in the direction of the y-axis (pitch axis). The wrist joints 134R and 134L can move in the directions of the x-axis (roll axis), the y-axis (pitch axis), and the z-axis (yaw axis).

The two arms 130R and 130L include upper links 135R and 135L, which connect the shoulder joints 132R and 132L to the elbow joints 133R and 133L, and include lower links 136L and 136L, which connect the elbow joints 133R and 133L to the wrist joints 134R and 134L. The upper links 135R and 135L and the lower links 136L and 136L can move with a degree of freedom of a given level according to the range of an actuation angle of the respective joints 132R, 132L, 133R, 133L, 134R, and 134L.

The body 120 connected to the two legs 110R and 110L includes a waist joint 121 to rotate a part corresponding to the waist of the robot 100. The head 140 connected to the body 120 includes a neck joint 141 to rotate a part corresponding to the neck of the robot 100.

In an exemplary embodiment, the two arms 130R and 130L correspond to manipulators 130 which perform work requiring motion and two hands 131R and 131L connected to the ends of the manipulators 130 correspond to end effectors 131. This is illustrated in brief in FIG. 3.

FIGS. 3a and 3b schematically illustrate a shape of a kinematic redundant manipulator of a robot according to an exemplary embodiment.

Figure 3:
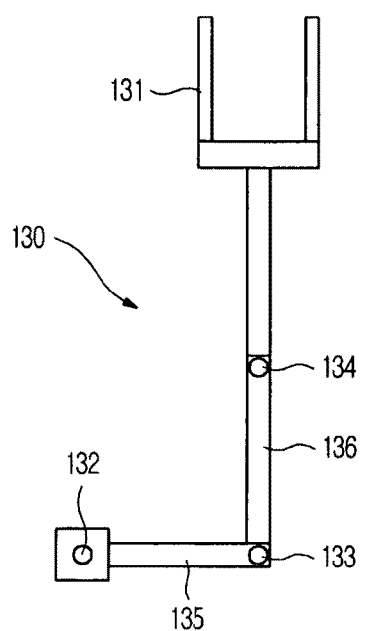
FIGS. 3a and 3b schematically illustrate a shape of a kinematic redundant manipulator of a robot according to an exemplary embodiment.
Figure 3:
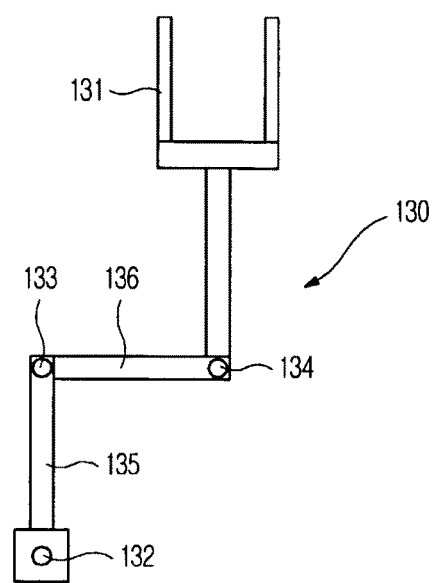

In FIG. 3, a manipulator 130 is configured to move similarly to the operation of human arms or hands by electrical and mechanical mechanism. The manipulator 130 is configured such that upper and lower links 135 and 136 are connected to each other through shoulder, elbow and wrist joints 132, 133, and 134. A kinetic characteristic of the manipulator 130 is determined according to a geometric relationship between the links 135 and 136 and the joints 132, 133, and 134. Mathematical expression of such a geometric relationship is called kinematics. The manipulator 130 shifts an end effector 131 in a direction to perform work by a kinematic characteristic. According to the exemplary embodiment, the manipulator 130 shifts the end effector 131 to a goal point to grasp an object using the links 135 and 136, the positions and directions of which can be controlled.

As illustrated in FIGS. 3a and 3b, the manipulator 130 which moves to a goal point to grasp the same object may variously change a shape thereof.

Figure 4:
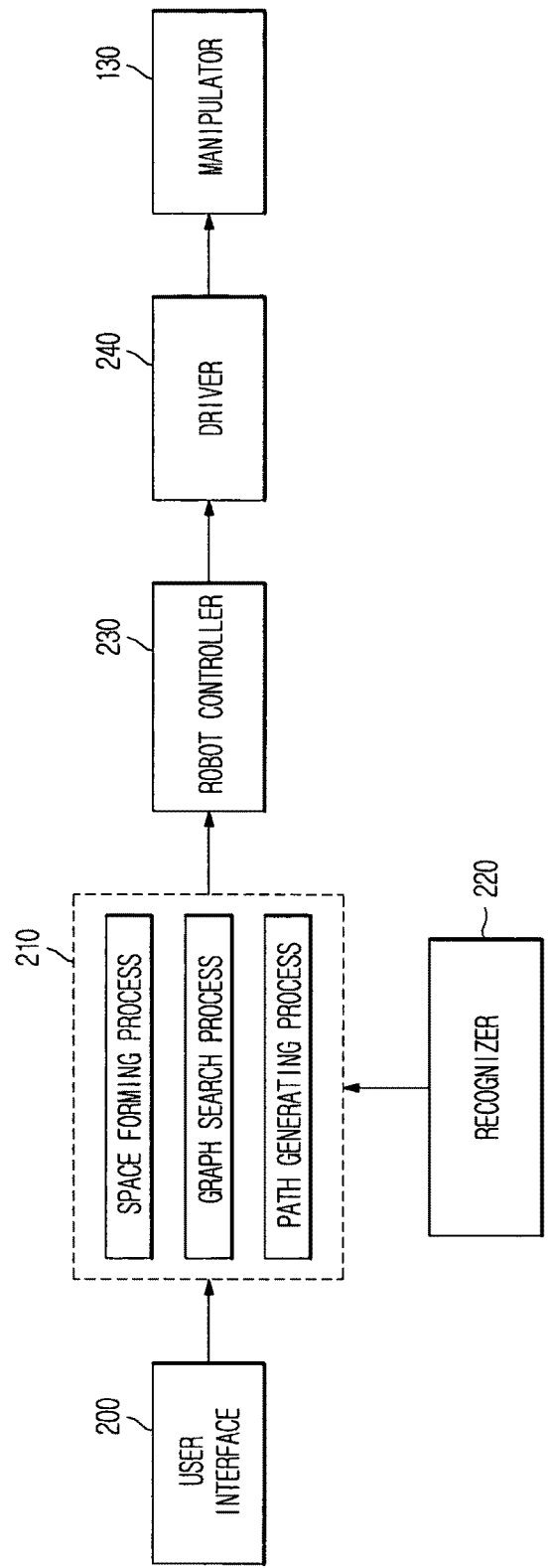
FIG. 4 is a block diagram of a path planning apparatus to plan a moving path of a manipulator of a robot according to an exemplary embodiment.

FIG. 4 is a block diagram of a path planning apparatus to plan a moving path of a manipulator of a robot according to an exemplary embodiment. The path planning apparatus includes a user interface 200, a path planning generator 210, a recognizer 220, a robot controller 230, and a driver 240.

The user interface 200 enables a user to input a work command (e.g., a command to grasp an object on a table) to be implemented by the robot 100, especially, by the manipulator 130 through a switch operation or voice, for example, although the input is not limited thereto.

The path planning generator 210 generates a path plan to control the movement of the manipulator 130 according to the work command input through the user interface 200 and transmits the path plan to the robot controller 230. A method to generate the path planning in the path planning generator 210 includes a space forming process, a graph search process, and a path generating process.

The space forming process serves to generate a configuration space (C-space) to generate a collision avoidance path. Here, a configuration refers to a set of parameters which can express positions and directions of the moving manipulator 130, and all spaces which can be occupied by configurations are called a C-space.

The graph search process serves to generate a connected network indicating a searchable path to generate an optimal path. In more detail, the graph search process generates nodes by a method to randomly extract configurations based on the C-space formed by a decomposition scheme of a cell, such as a tree with respect to the moving manipulator 130 and to exclude configurations which create collision with an obstacle space. Then the graph search process searches for a search graph to generate a path by generating a search tree connecting the generated nodes.

The path generating process serves to generate an optimal path to connect a start point and a goal point while avoiding an obstacle space so that collision may not occur in a connected network of a given search space.

The processes may be executed by a processing device.

The recognizer 220 recognizes, in the C-space, given information which enables the manipulator 130 to perform a work command and transmits the information to the path planning generator 210. The information includes a configuration (start point) at an initial position of the manipulator 130 before the manipulator 130 performs the work command, a configuration (goal point) at a goal position of the manipulator 130 where the manipulator 130 can perform the work command, and obstacles between the start point and the goal point. The information recognized by the recognizer 220 is used by the path planning generator 210 as a basis to plan the moving path of the manipulator 130.

The robot controller 230 drives the manipulator 130 by controlling the driver 240 according to the path plan transmitted from the path planning generator 210, thereby controlling the movement of the manipulator 130.

Hereinafter, the robot configured as described above, and an operation process and effect of a path planning method thereof will be described.

Figure 5:
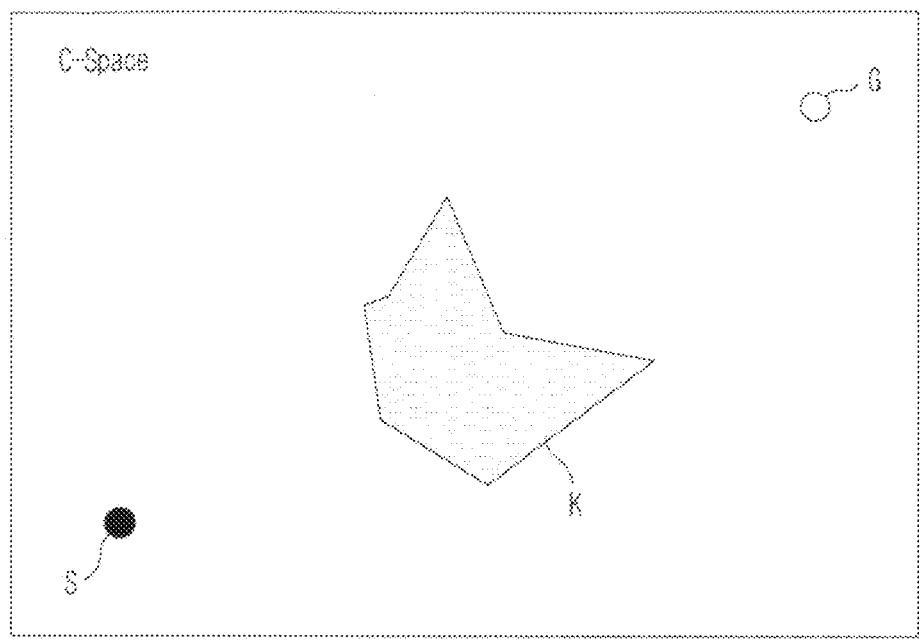
FIG. 5 illustrates a configuration-space (C-space) according to an exemplary embodiment.

FIG. 5 illustrates a C-space according to an exemplary embodiment.

In FIG. 5, a C-space is a dynamic space in which the manipulator 130 performs work. A reference symbol 'S' refers to a start point which forms a configuration at an initial position by one node in the C-space before the manipulator 130 performs work, G refers to a goal point which forms a configuration by one node in the C-space at a goal position where the manipulator 130 can perform work, that is, the manipulator 130 can grasp an object, and 'K' refers to an obstacle space between the start point S and the goal point G.

Figure 6:
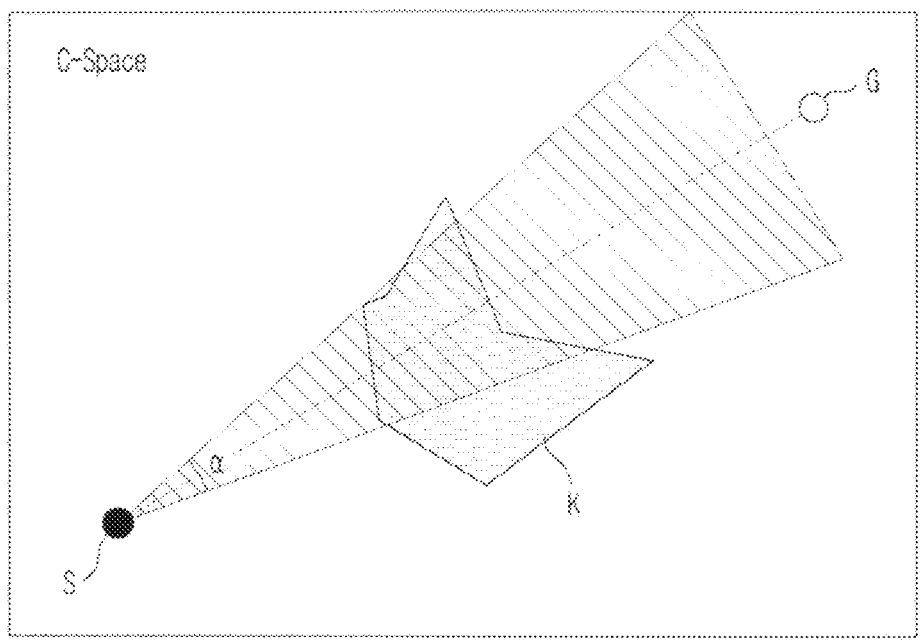
FIG. 6 visually illustrates a process of recognizing a middle point in FIG. 5.

FIG. 6 visually illustrates a process of recognizing a middle point in FIG. 5.

In FIG. 6, an obstacle within a prescribed angle α based on a straight line connecting a start point S and a goal point G is recognized as a middle point K. The middle point K may be represented at a center point of the obstacle within the C-space or at any point on the obstacle represented in the C-space.

Figure 7:
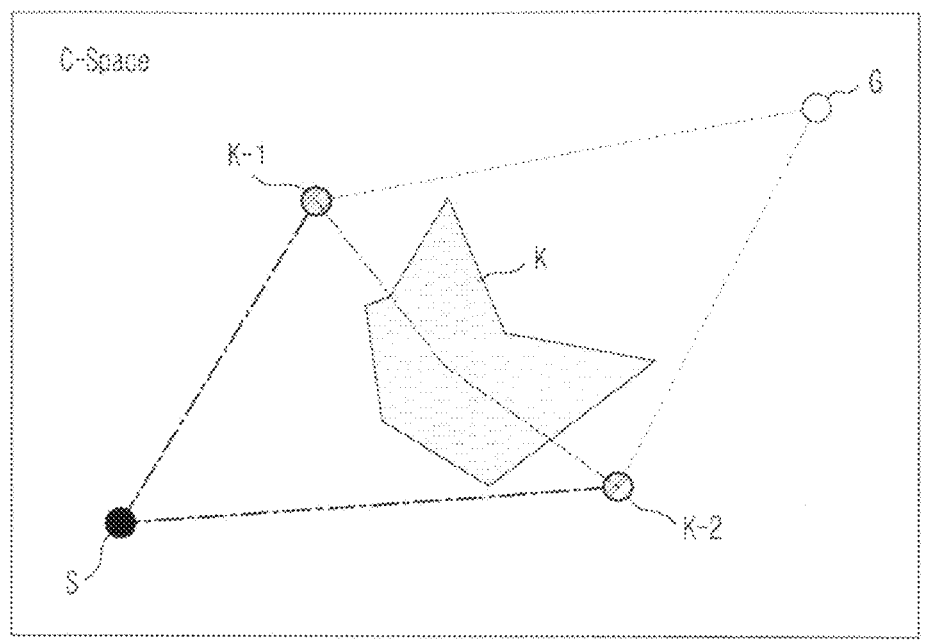
FIGS. 7 and 8 visually illustrate a process of selecting waypoints based on the middle point recognized in FIG. 6.
Figure 8:
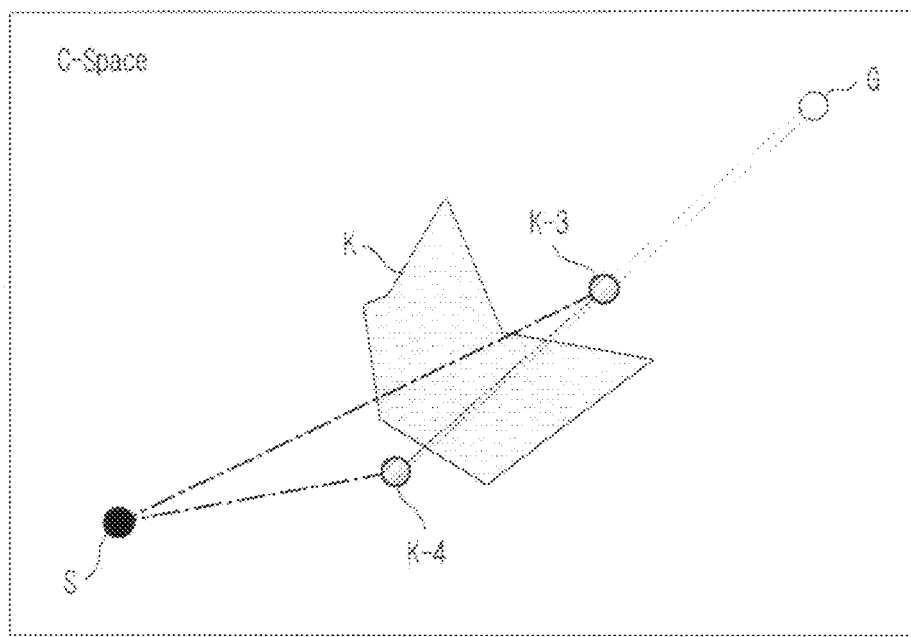

FIGS. 7 and 8 visually illustrate a process of selecting waypoints based on the middle point K recognized in FIG. 6.

In FIG. 7, arbitrary points K-1 and K-2 separated from the middle point K by a prescribed distance are selected, and the selected arbitrary points K-1 and K-2 are connected to a start point S and to a goal point G.

In FIG. 7, since the selected arbitrary points K-1 and K-2 can be connected to the start point S and to the goal point G without passing the middle point K, the arbitrary points K-1 and K-2 are selected as waypoints. Points selected as the waypoints are middle nodes located at points which can see both the start point S and the goal point G.

In FIG. 8, arbitrary points K-3 and K-4 separated from a middle point K by a prescribed distance are selected, and the selected arbitrary points K-3 and K-4 are connected to a start point S and to a goal point G.

In FIG. 8, since the middle point K is present on straight lines connecting the selected arbitrary points K-3 and K-4 to the start point S and to the goal point G, the selected arbitrary points K-3 and K-4 cannot be connected to the start point S and to the goal point G without passing through the middle point K. Therefore, the selected arbitrary points K-3 and K-4 are not selected as waypoints. That is, since the arbitrary point K-3 can see the goal point G but cannot see the start point S and the arbitrary point K-4 can see the start point S but cannot see the goal point G, the arbitrary points K-3 and K-4 cannot be selected as waypoints.

The path planning generator 210 of the at least one embodiment recognizes an obstacle within a prescribed angle α based on a straight line between the start point S and the goal point G as the middle point K and selects the arbitrary points K-1 and K-2 separated from the middle point K by a prescribed distance. Then the path planning generator 210 selects the arbitrary points K-1 and K-2 which can see the start point S and the goal point G as waypoints.

If the waypoints are selected, the path planning generator 210 plans a moving path of the manipulator 130 by a tree extension method using the RRT algorithm.

The RRT algorithm visualizes the manipulator 130 as a tree formed by one node in a C-space and searches for a path satisfying a restriction condition, such as obstacle avoidance, from the start point S up to the goal point G. The tree is extended by repeating a process of determining the nearest node among nodes belonging to the tree to a randomly sampled configuration and selecting a new node separated by a prescribed distance from the nearest node. A method to generate a path plan using the RRT algorithm according to the present embodiment will now be described in detail with reference to FIGS. 9 to 12.

Figure 9:
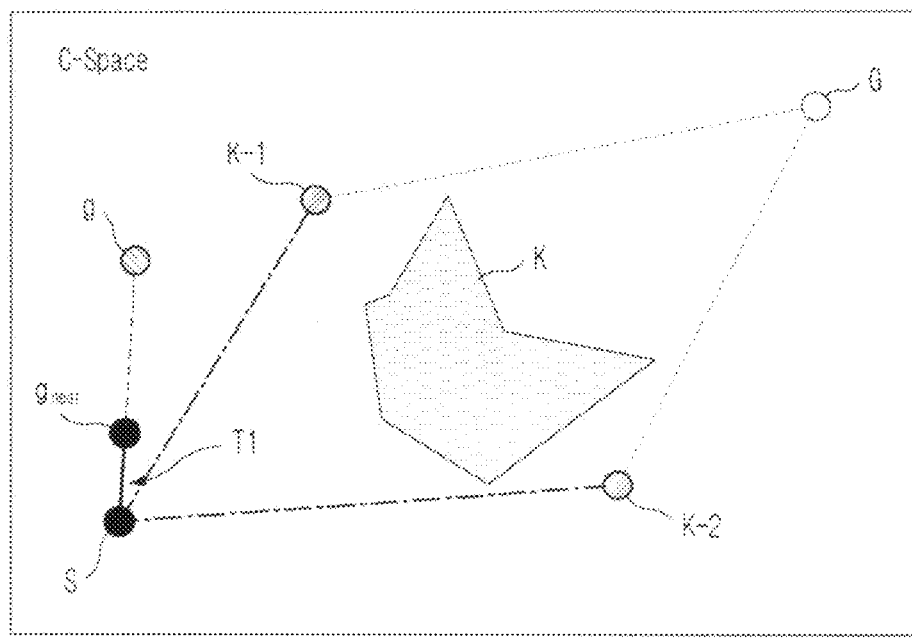
FIG. 9 visually illustrates a process of generating a tree by selecting a waypoint when a middle point is present between a start point and a goal point in a C-space according to an exemplary embodiment.

FIG. 9 visually illustrates a process of generating a tree by selecting a waypoint when a middle point is present between a start point and a goal point in a C-space according to an exemplary embodiment.

In FIG. 9, to plan a moving path satisfying a restriction condition in a C-space where waypoints K-1 and K-2 are selected, a node $g_{near}$ which is the nearest node to a randomly sampled configuration point g is selected. Then, by connecting the nearest node $g_{near}$ and a start point S, a tree T1 is extended.

Figure 10:
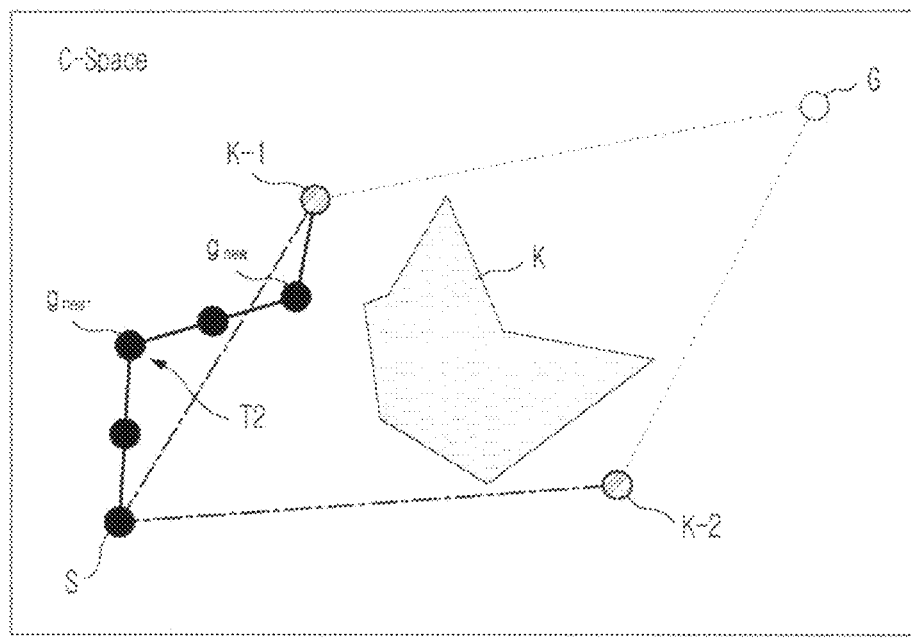
FIG. 10 visually illustrates a process in which a tree reaches a waypoint in a C-space in which the waypoint is selected according to an exemplary embodiment.

FIG. 10 visually illustrates a process in which a tree reaches a waypoint in a C-space in which the waypoint is selected according to an exemplary embodiment.

In FIG. 10, the tree T1 is extended to a tree T2 by connecting a newly sampled configuration $g_{new}$ and a nearest node $g_{near}$. Since a point obtained from the sampled configuration $g_{new}$ is near to a waypoint K-1, the waypoint K-1 is selected as a goal waypoint of waypoints K-1 and K-2 and the tree T2 is extended to the waypoint K-1.

Figure 11:
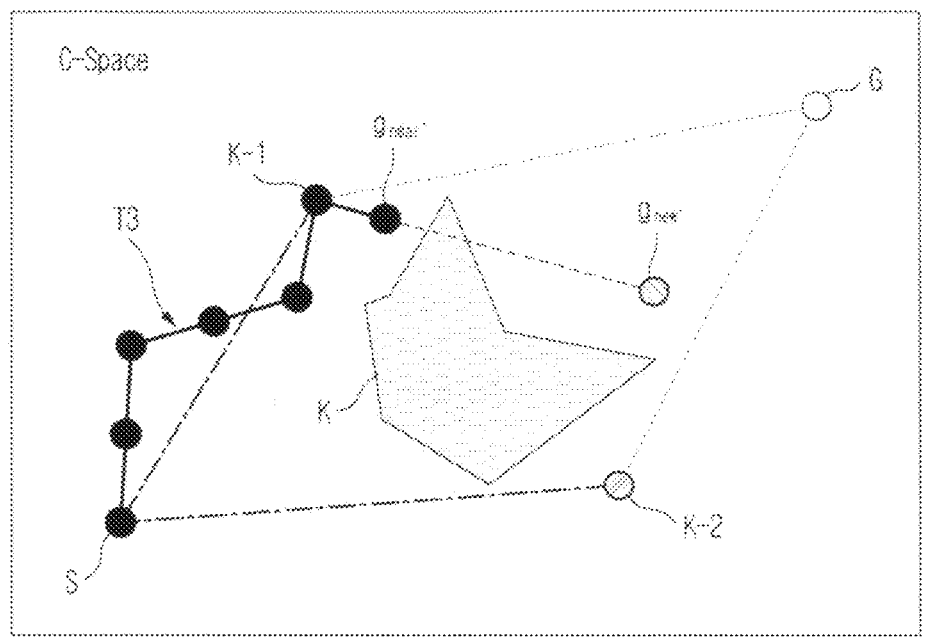
FIGS. 11 and 12 visually illustrate a process of extending a tree via a waypoint in a C-space in which the waypoint is selected according to an exemplary embodiment.
Figure 12:
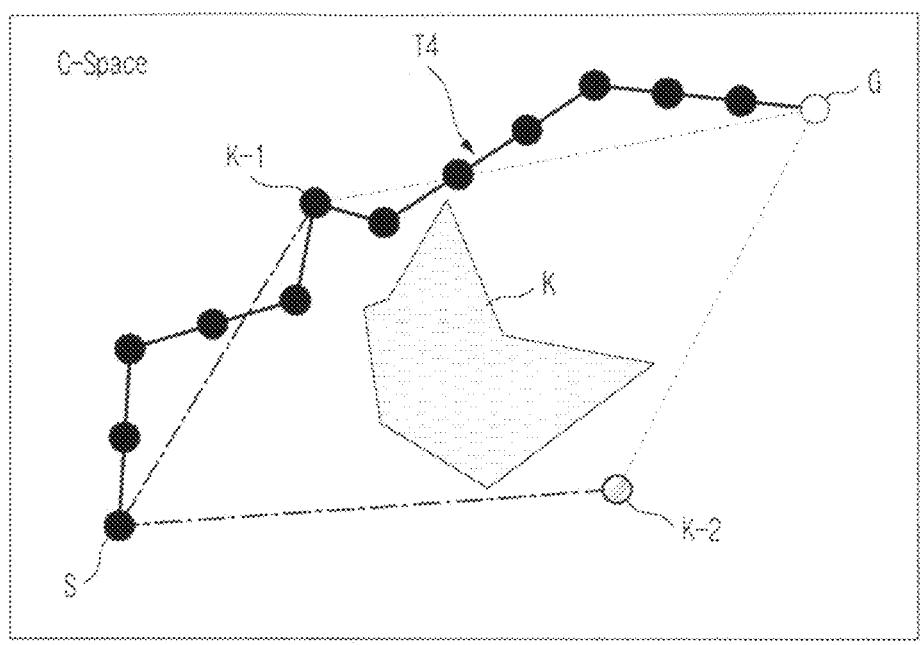

FIGS. 11 and 12 visually illustrate a process of extending a tree via a waypoint in a C-space in which the waypoint is selected according to an exemplary embodiment.

In FIGS. 11 and 12, the tree T2 extended in FIG. 10 proceeds in the direction of a goal point G via a waypoint K-1. Similarly to FIG. 10, a tree T3 is extended by connecting a newly sampled configuration $g_{new}$ and a nearest node $g_{near}$. Such a process is repeated to extend a tree T4 to a goal point G.

While extending the tree T4 to the goal point G, if a distance between the goal point G and the end effector 131 of the manipulator 130 is less than a prescribed distance, the graph search process is performed to search for the moving path of the manipulator 130.

Figure 13:
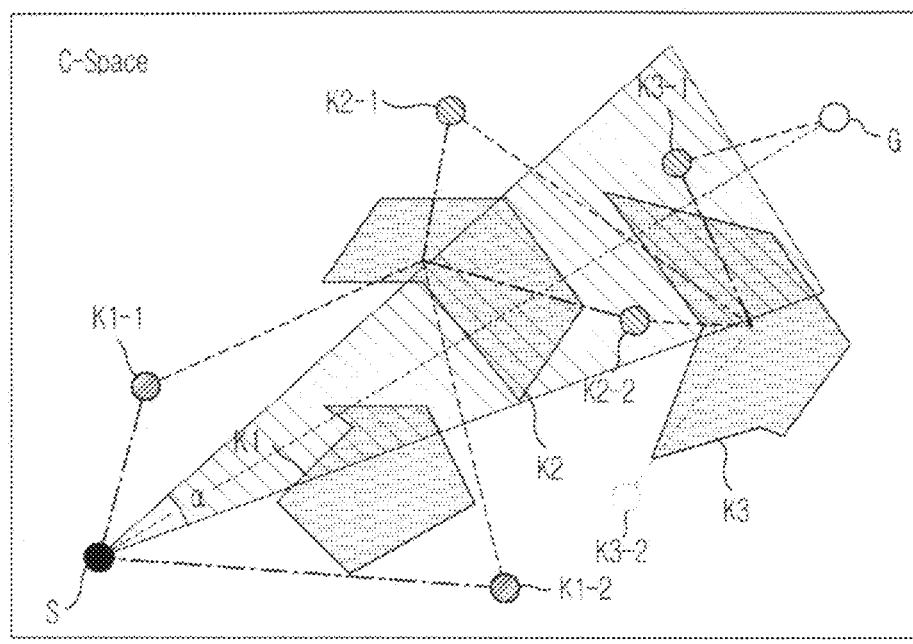
FIG. 13 visually illustrates a process of selecting waypoints when a plurality of obstacles is present between a start point and a goal point in a C-space according to an exemplary embodiment.

FIG. 13 visually illustrates a process of selecting waypoints when a plurality of obstacles is present between a start point and a goal point in a C-space according to an exemplary embodiment.

In FIG. 13, obstacles within a prescribed angle α based on a straight line connecting a start point S and a goal point G are recognized as middle points K1, K2, and K3, and arbitrary points K1-1 and K1-2, K2-1 and K2-2, and K3-1 and K3-2 separated respectively from the middle points K1, K2, and K3 by a prescribed distance are selected.

If the points K1-1 and K1-2 selected based on the middle point K1 can see the start point S and the points K2-1 and K2-2, the points K1-1 and K1-2 are selected as waypoints. If the points K2-1 and K2-2 selected based on the middle point K2 can see the points K1-1 and K1-2 and the points K3-1 and K3-2, the points K2-1 and K2-2 are selected as waypoints. If the points K3-1 and K3-2 selected based on the middle point K3 can see the points K2-1 and K2-2 and the goal point G, the points K3-1 and K3-2 are selected as waypoints.

If the waypoints are selected in the above-described way, a waypoint which is nearest to a randomly sampled configuration starting from the start point S to generate a tree is selected as a goal waypoint. If a plurality of sampled configurations is present, priority may be given based on a goal score. A method having priority based on the goal score is the same as a conventional RRT algorithm.

The path planning generator 210 according to the exemplary embodiment recognizes obstacles within a prescribed angle α based on a straight line connecting a start point S and a goal point G as middle points K1, K2, and K3, selects arbitrary points K1-1 and K1-2, K2-1 and K2-2, and K3-1 and K3-2 separated respectively from the middle points K1, K2, and K3 by a prescribed distance, and selects the points K1-1, K1-2, K2-1, K2-2, and K3-1 which can see the start point S and the goal point G as waypoints. If one of the arbitrary points K3-2 cannot see the goal point G, the point K3-2 is not selected as a waypoint.

If the waypoints K1-1, K1-2, K2-1, K2-2, and K3-1 are selected, the path planning generator 210 plans the moving path of the manipulator 130 by a tree extension method using the RRT algorithm.

Figure 14:
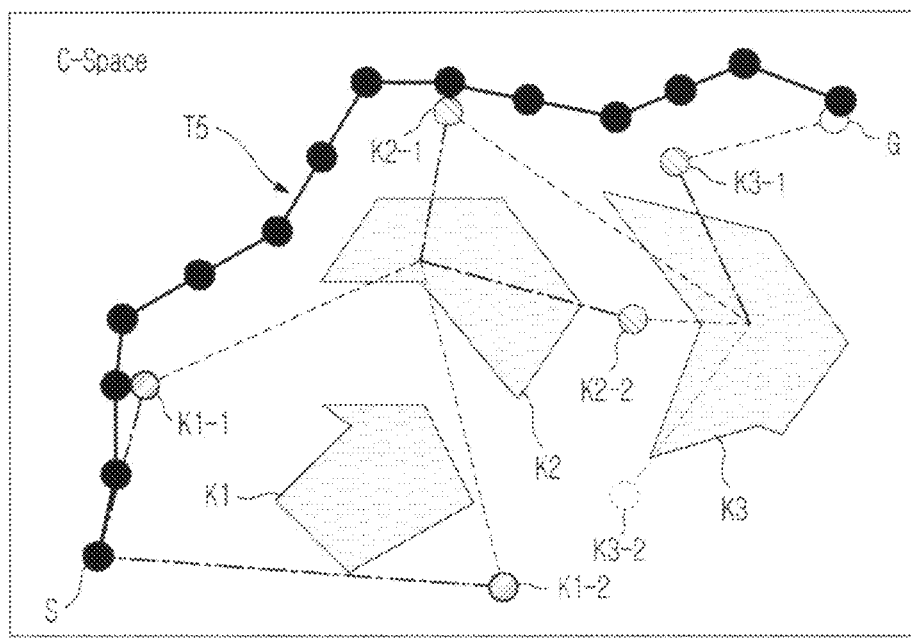
FIG. 14 visually illustrates a process of selecting a tree by selecting waypoints when a plurality of obstacles is present between a start point and a goal point in a C-space according to an exemplary embodiment.

FIG. 14 visually illustrates a process of selecting a tree by selecting waypoints when a plurality of obstacles is present between a start point and a goal point in a C-space according to an exemplary embodiment.

To plan a moving path satisfying a restriction condition in a C-space in which waypoints K1-1, K1-2, K2-1, K2-2, and K3-1 are selected, a node which is the nearest to a randomly sampled configuration is selected. Then a tree T5 is extended by connecting the sampled configuration and the nearest node. Next, the tree T5 is extended by connecting a newly sampled configuration and a nearest node. In this case, since a point obtained from the sampled configuration is nearer to the waypoint K1-1 than to the waypoint K1-2, the waypoint K1-1 is selected as a goal waypoint and the tree T5 is extended to the waypoint K1-1.

The extended tree T5 proceeds towards a goal point G via the waypoint K1-1. In this case, the tree T5 is extended by connecting a newly sampled configuration and a nearest node. Next, the tree T5 is extended by connecting a newly sampled configuration and a nearest node. Since a point obtained from the sampled configuration is nearer to the waypoint K2-1 than to the waypoint K2-2, the waypoint K2-1 is selected as a goal waypoint and the tree T5 is extended to the waypoint K2-1.

The extended tree T5 proceeds towards the goal point G via the waypoints K1-1 and K2-1. In this case, the tree T5 is extended by connecting a newly sampled configuration and a nearest node. Next, the tree T5 is extended by connecting a newly sampled configuration and a nearest node. Since a point obtained from the sampled configuration is near to the waypoint K3-1, the waypoint K3-1 is selected as a goal waypoint and the tree T5 is extended to the waypoint K3-1.

Similarly, the extended tree T5 proceeds towards the goal point G via the waypoints K1-1, K2-1, and K3-1. Theses processes are repeated to extend the tree T5 to the goal point G.

While extending the tree T5 to the goal point G, if a distance between the goal point G and the end effector 131 of the manipulator 130 is less than a prescribed distance, the graph search process is performed to search for the moving path of the manipulator 130.

FIGS. 15 to 18 illustrate a simulation operation for a path plan in a work space according to an exemplary embodiment.

Figure 15:
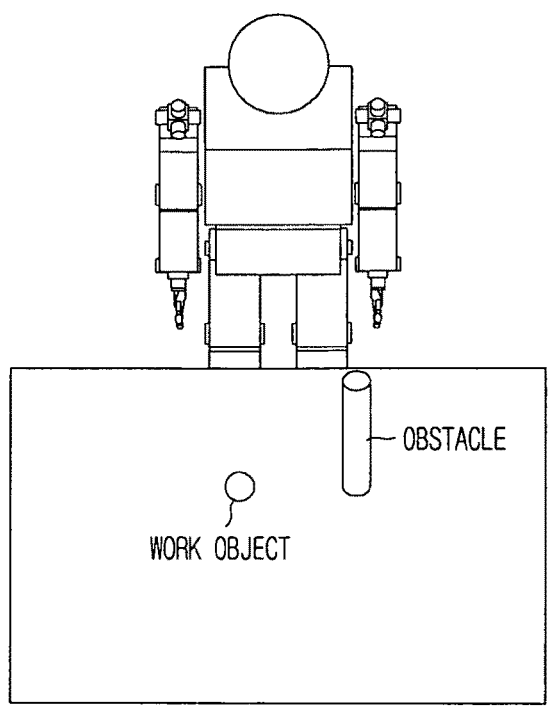
FIGS. 15 to 18 illustrate a simulation operation for a path plan in a work space according to an exemplary embodiment.

FIG. 15 illustrates a configuration (a start point S) at an initial position before the manipulator 130 performs work. On a table are placed a ball which is a work object and a cylinder which is an obstacle.

Figure 16:
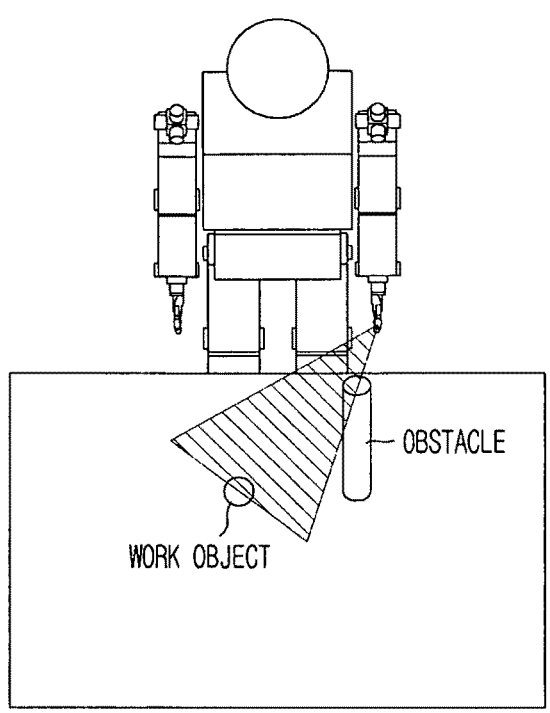

FIG. 16 illustrates a configuration (a goal point G) at a goal position in which the manipulator 130 performs work.

Figure 17:
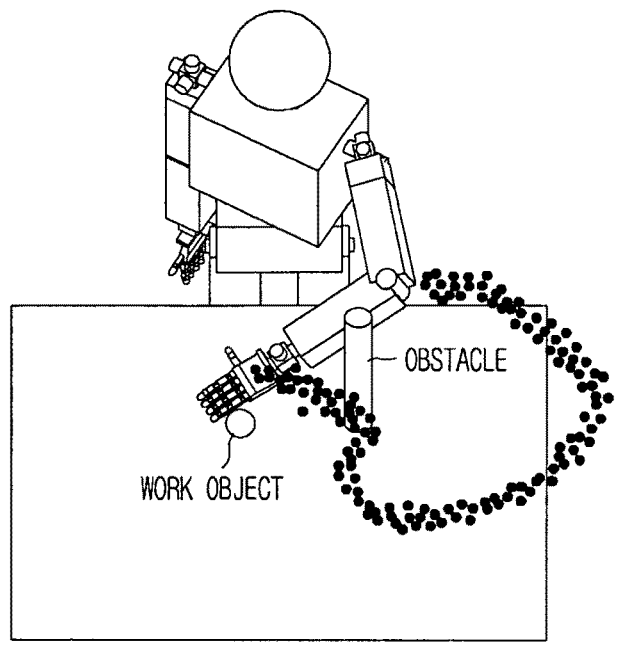

FIG. 17 illustrates a process in which the manipulator 130 searches for a solution through a variation of a goal function. It can be understood that multiple nodes are generated and a long path reaching a work object (ball) is generated to avoid an obstacle (cylinder). Therefore, considerable time is consumed to search a moving path since a speed to search for a solution becomes slow.

Figure 18:
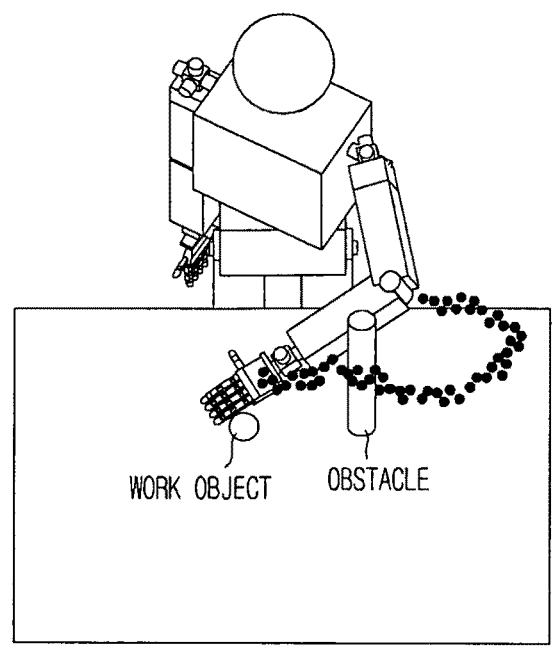

FIG. 18 illustrates a process in which the manipulator 130 searches for a solution via a middle point proposed by the present embodiment. Compared with the process of FIG. 17, a small number of nodes are generated and a short path reaching a work object (ball) is generated to avoid an obstacle (cylinder). Accordingly, speed to search for a solution is increased and time to search for a moving path is shortened.

Figure 19:
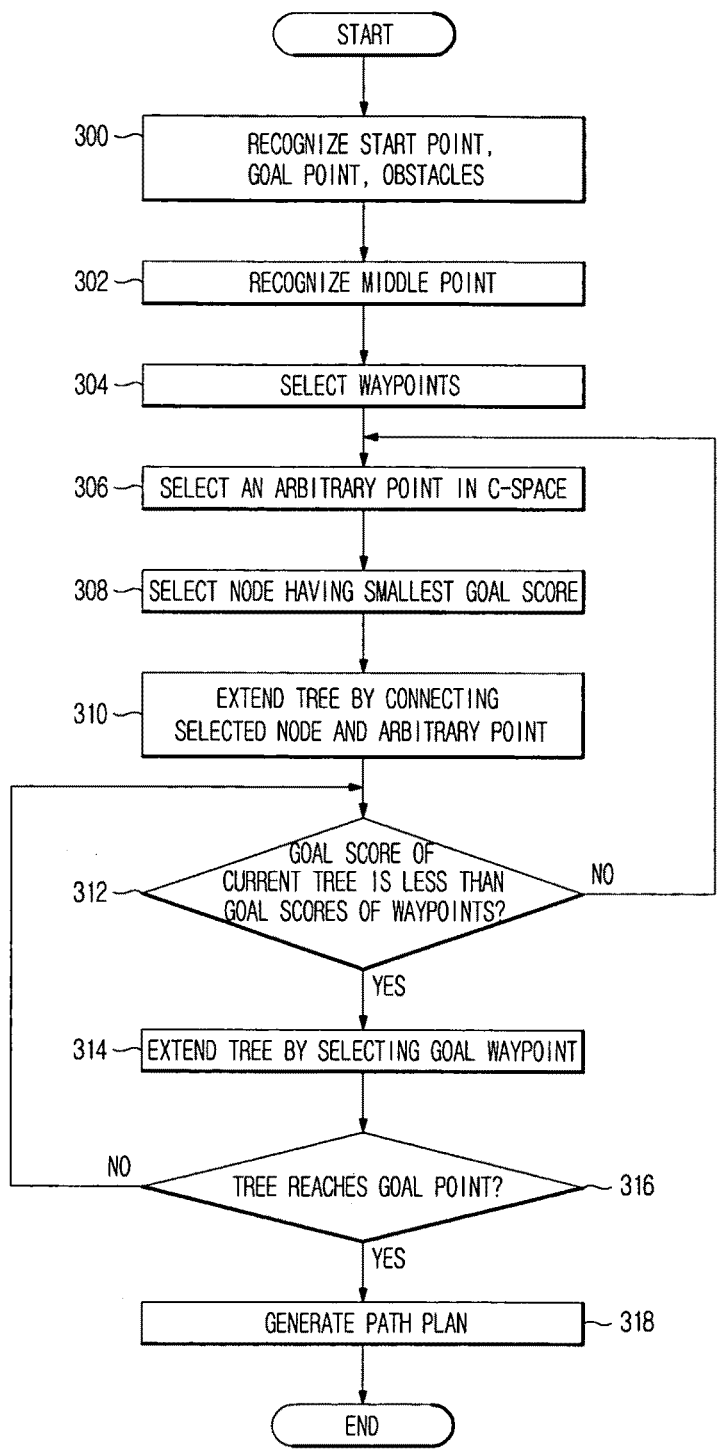
FIG. 19 is a flow chart illustrating a path planning method of a robot according to an exemplary embodiment.

FIG. 19 is a flow chart illustrating a path planning method of a robot according to an exemplary embodiment.

Referring to FIG. 19, the recognizer 220 recognizes, in the C-space, the configuration (start point S) at an initial position of the manipulator 130 before the manipulator 130 performs a work command, the configuration (goal point G) at a goal position where the manipulator 130 can perform the work command, and obstacles between the start point S and the goal point G and transmits the recognized information to the path planning generator 210 (300, refer to FIG. 5).

The path planning generator 210 recognizes an obstacle within a prescribed angle on a straight line connecting the start point S and goal point G as the middle point K (302, refer to FIG. 6). The path planning generator 210 selects the arbitrary points K-1 and K-2 separated from the recognized middle point K by a prescribed distance, connects the selected arbitrary points K-1 and K-2 to the start point S and to the goal point G, and selects the arbitrary points K-1 and K-2 as waypoints (304, refer to FIG. 7).

In generating a tree to plan a moving path satisfying a restriction condition in the C-space in which the waypoints K-1 and K-2 are selected, the path planning generator 210 searches the nearest node $g_{near}$ to a to any one randomly sampled point, i.e., the configuration g, and connects the sampled configuration g to the nearest node $g_{near}$, thereby extending the tree T1. In this case, a goal function includes a distance and a direction vector from the goal point G to the end effector 131, and the tree T1 is extended by selecting a node having a smallest goal score (306 to 310, refer to FIG. 9).

It is determined whether a goal score of the extended tree T1 is less than a goal score of the waypoints K-1 and K-2 (312). If the goal score of the current tree T1 is not less than goal scores of the waypoints K-1 and K-2, step 312 returns to step 306 to store a new sample.

If the goal score of the current tree T1 is less than the goal scores of the waypoints K-1 and K-2, the tree T1 is extended to the tree T2 by connecting the newly sampled configuration $g_{new}$ and the nearest node $g_{near}$. In this case, since a point obtained from the sampled configuration $g_{new}$ is nearer to the waypoint K-1 than to the waypoint K-2, the tree T2 is extended to the waypoint K-1 by selecting the waypoint K-1 as a goal waypoint (314, refer to FIG. 10).

The extended tree T2 proceeds to a direction toward the goal point G via the waypoint K-1. Just as in FIG. 10, the tree T3 is extended by connecting the newly sampled configuration $g_{new}$ to the nearest node $g_{near}$, and such an extension process is repeated to extend the tree T4 to the goal point G (316, refer to FIG. 11).

While extending the tree T4 to the goal point G, if a distance between the goal point G and the end effector of the manipulator 130 is less than a prescribed distance, it is recognized that a moving path has been found and the moving path of the manipulator 130 is searched through the graph search process (318, refer to FIG. 12). Otherwise, the process returns to operation 312. Next, the robot controller 230 controls the driver 240 according to the generated path plan to control the movement of the manipulator 130.

One or more of units/hardware described in the application, for example, the path planning generator 210 may be executed on a processing device or may be implemented as hardware device. The units may also be configured to act as one or more software modules in order to perform the operations of the above-described embodiments and may cause a general purpose computer or processor or a particular machine to perform any of the operations discussed above.

Aspects of the present at least one embodiment can also be embodied as computer-readable codes on a computer-readable medium, where the computer readable medium can cause a processor to perform operations, for example. Also, codes and code segments to accomplish the present at least one embodiment can be easily construed by programmers skilled in the art to which the present invention pertains. The computer-readable medium may be a computer-readable storage medium, which is any data storage device that can store data which can be thereafter read by a computer system or computer code processing apparatus. Examples of the computer-readable storage medium include read-only memory (ROM), random-access memory (RAM), CD-ROMs, magnetic tapes, floppy disks, and optical data storage devices. The computer-readable medium can also be distributed over network-coupled computer systems so that the computer-readable code is stored and executed in a distributed fashion.

As is apparent from the above description, an obstacle within a prescribed angle on a straight line connecting a start point and a goal point is recognized as a middle point and arbitrary points separated from the middle point by a prescribed distance are selected. Among the selected points, arbitrary points which can directly connect the start point and the goal point without passing the obstacle are selected as waypoints to map a new middle node. A path is extended via the middle node and extension of a tree in a wrong direction is minimized so that the manipulator is not stuck at local minima without depending greatly on a goal score, thereby improving the performance of path planning and rapidly searching for a path.

Although at least one embodiment has been shown and described, it would be appreciated by those skilled in the art that changes may be made in these embodiments without departing from the principles and spirit of the invention, the scope of which is defined in the claims and their equivalents.

What is claimed is:

1. A path planning method for a robot, comprising:
  forming a configuration space, by a processing device, to generate a moving path of a manipulator of the robot;
  selecting at least one waypoint by recognizing an obstacle as a middle point in the configuration space when the obstacle is present between a start point and a goal point of the configuration space, by selecting arbitrary points separated from the middle point by a prescribed distance to connect the arbitrary points to the start point and to the goal point, and by selecting at least one of the selected arbitrary points having no obstacle between the selected arbitrary points and the start point and between the selected arbitrary points and the goal point as the at least one waypoint;

generating a search graph by extending a tree so that a node generated at the start point reaches the goal point via the at least one waypoint; and generating an optimal path to avoid the obstacle by connecting the start point and the goal point through the search graph.

2. The path planning method according to claim 1, wherein the start point is a node which forms, in the configuration space, a configuration at an initial position before the manipulator performs work.

3. The path planning method according to claim 1, wherein the goal point is a node which forms, in the configuration space, a configuration at a goal position in which the manipulator performs work or a point having a position of the goal point and orientation information.

4. The path planning method according to claim 1, wherein the obstacle recognized as the middle point in the configuration space is an obstacle within a prescribed angle on a straight line connecting the start point and the goal point.

5. The path planning method according to claim 1, wherein the selecting the at least one waypoint includes selecting a nearest waypoint to a randomly sampled configuration, starting from the start point, as a goal waypoint.

6. The path planning method according to claim 1, wherein the extending the tree includes searching for a nearest node to a randomly sampled configuration based on a goal function varied according to probability and connecting the sampled configuration to the nearest node.

7. The path planning method according to claim 6, wherein the extending the tree includes extending the tree to the at least one waypoint when a goal score of the extended tree is less than a goal score of the at least one waypoint.

8. The path planning method according to claim 6, wherein the extending the tree includes extending the tree by searching for a new node through a variation of a goal function when a goal score of the extended tree is not less than a goal score of the at least one waypoint.

9. A path planning method for a robot, comprising:
recognizing a start point and a goal point corresponding respectively to an initial configuration and a goal configuration, in a configuration space, of a manipulator of the robot;

mapping at least one waypoint by recognizing an obstacle as a middle point when the obstacle is present between the start point and the goal point, by selecting arbitrary points separated from the middle point by a prescribed distance to connect the selected arbitrary points to the start point and to the goal point, and by selecting at least one of the selected arbitrary points having no obstacle between the selected arbitrary points and the start and goal points as the at least one waypoint;

searching for a node nearest to a randomly sampled point in the configuration space to connect the randomly sampled point to the node;

generating a search graph by extending a tree so that the node reaches the goal point via the at least one waypoint; and generating an optimal path to avoid the obstacle by connecting the start point to the goal point through the search graph, wherein at least one of the recognizing, the mapping, the searching, the generating the search graph and the generating the optimal path are performed using a processor.

10. The path planning method according to claim 9, wherein the mapping of the at least one waypoint includes selecting the at least one waypoint in consideration of a goal function.

11. The path planning method according to claim 9, wherein the obstacle recognized as the middle point in the configuration space is an obstacle within a prescribed angle on a straight line connecting the start point and the goal point.

12. The path planning method according to claim claim 11, wherein the mapping the waypoint includes extending the tree by selecting a nearest waypoint to a randomly sampled configuration, starting from the start point, as a goal waypoint.

13. A path planning apparatus of a robot, comprising:
a processor;
a recognizer to recognize a start point and a goal point corresponding respectively to an initial configuration and a goal configuration, in a configuration space, of a manipulator of the robot, and an obstacle between the start point and the goal point in the configuration space; and a path planning generator to form the configuration space utilized to generate a moving path of the manipulator, to select at least one waypoint by recognizing the obstacle as a middle point based on the configuration space, and to generate an optimal path by connecting the start point and the goal point using the at least one waypoint, to select arbitrary points separated from the middle point by a prescribed distance to connect the arbitrary points to the start point and to the goal point, and to select at least one of the selected arbitrary points having no obstacle between the selected arbitrary points and the start and goal points as the at least one waypoint, wherein at least one of the recognizer and the path planning generator are implemented using the processor.

14. The path planning apparatus according to claim 13, wherein the obstacle recognized as the middle point is an obstacle within a prescribed angle on a straight line connecting the start point and the goal point.

15. The path planning apparatus according to claim 13, wherein the path planning generator searches for a node nearest to a randomly sampled point in the configuration space to connect the randomly sampled point and the node and generates a search graph by extending a tree so that the node reaches the goal point via the at least one waypoint.

16. The path planning apparatus according to claim 15, wherein the path planning generator extends the tree by connecting a newly sampled point and a nearest node to the newly sampled point and selects a nearest waypoint to the newly sampled point as a goal waypoint.

* * * * *